May 22, 1934.　　　L. A. GEBHARD　　　1,959,356
MEASURING SYSTEM FOR HIGH FREQUENCY APPARATUS
Filed June 21, 1933　　　2 Sheets-Sheet 1
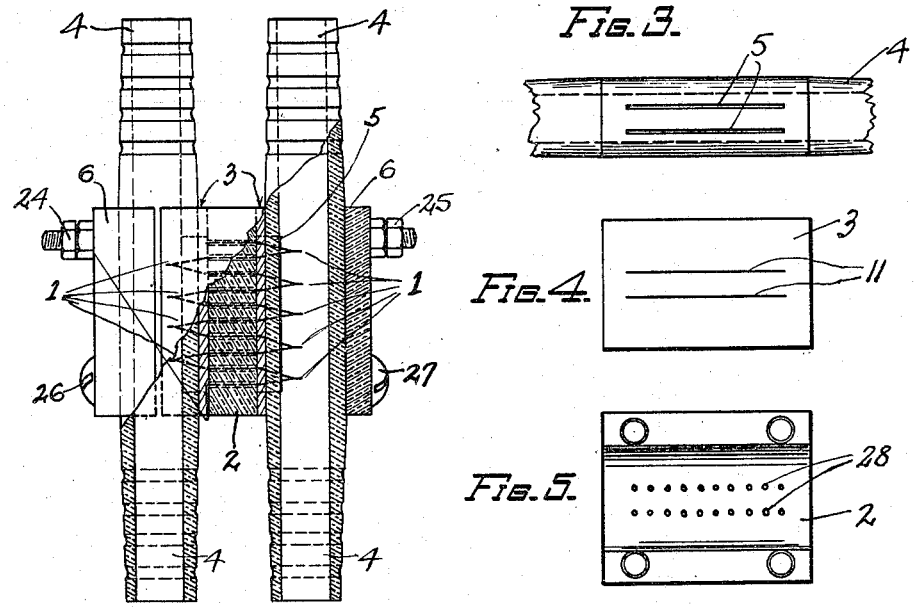
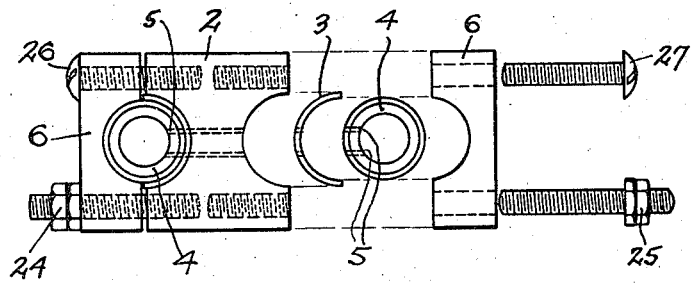
Inventor
LOUIS A. GEBHARD.
By Harold Dodd.
Attorney May 22, 1934.   L. A. GEBHARD   1,959,356
MEASURING SYSTEM FOR HIGH FREQUENCY APPARATUS
Filed June 21, 1933   2 Sheets-Sheet 2
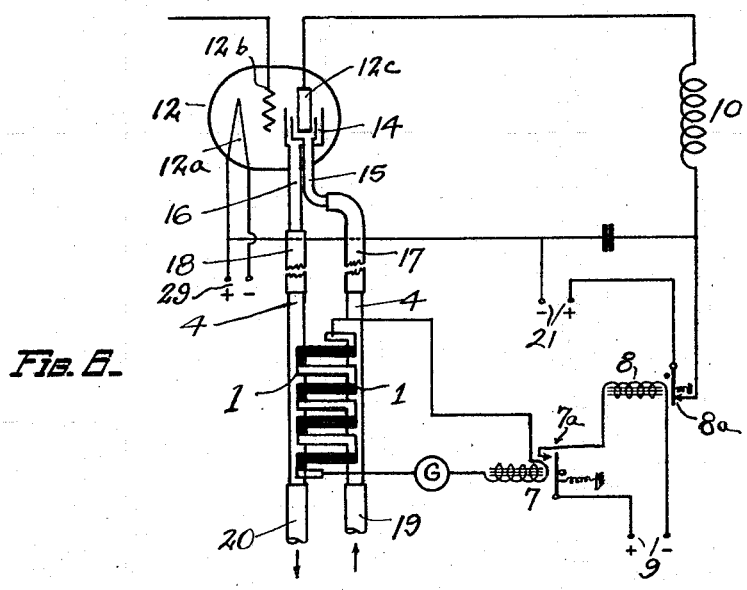
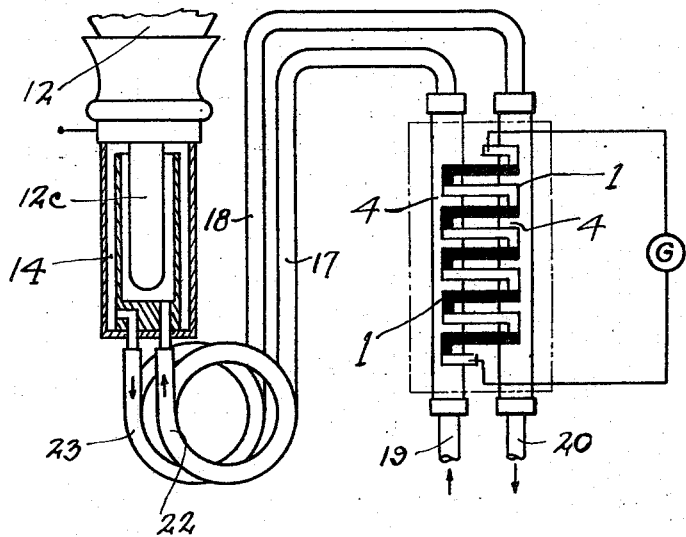
Inventor
LOUIS A. GEBHARD.
By Harold Todd
Attorney Patented May 22, 1934

1,959,356

UNITED STATES PATENT OFFICE 1,959,356

MEASURING SYSTEM FOR HIGH FREQUENCY APPARATUS

Louis A. Gebhard, Washington, D. C.

Application June 21, 1933, Serial No. 676,948

10 Claims. (Cl. 171—95)

(Granted under the act of March 3, 1883, as amended April 30, 1928; 370 O. G. 757)

My invention relates broadly to high frequency signal transmission and more particularly to a method and apparatus for measuring losses in a high frequency transmitter.

One of the objects of my invention is to provide means for electrically determining the losses in a high frequency transmission system for checking the efficiency of the transmitting apparatus.

Another object of my invention is to provide an electrical system for measuring losses in a high power electron tube transmitter, including tube losses due to the voltage drop of the anode circuit inside of the tube, losses in the output coil system, losses in the condensers and distributed capacities existing in the circuit including losses in insulated materials which must support the physical parts of the circuits from the framework of the transmitter.

Still another object of my invention is to provide a construction and thermocouple system which is acted upon by the cooling water of a high power tube system for generating an electromotive force dependent upon temperature of the cooling water which will permit a reading to be taken by a suitable measuring instrument indicative of power loss in the apparatus.

Still another object of my invention is to provide a construction of thermocouple device wherein a plurality of thermocouples may be maintained in position in the fluid inlet and outlet paths of a fluid cooling system of a high power tube transmitter for generating under conditions of temperature change a current operative to control a measuring instrument for indicating losses in the transmitter.

A further object of my invention is to provide a circuit arrangement for protecting the electron tube circuits in an electron tube transmitter in the event that losses become excessive by automatically reducing or cutting off plate potential from the tube system under conditions of excessive loss.

Other and further objects of my invention will be understood more fully in the specification hereinafter following by reference to the accompanying drawings, in which:

Figure 1 is an elevational view of the thermocouple apparatus of my invention, partially broken away and illustrated in cross section and showing the fluid inlet and output connections for the apparatus for providing a circulatory path for the cooling fluid into and out of the cooling system of a high power tube; Fig. 2 is a top plan view of the thermocouple apparatus illustrated in Fig. 1 with parts partially disassembled in order to show the interrelationship of the several elements constituting the apparatus of my invention; Fig. 3 is a plan view showing the slotted structure of one of the fluid conduits employed in the thermocouple apparatus of my invention; Fig. 4 is a plan view of a fluid tight gasket which is employed in association with the mounting blocks and the tubular conduits in the apparatus of my invention; Fig. 5 is an elevational view of one of the insulated parts forming the support for the thermocouple elements in the apparatus of my invention; Fig. 6 is a circuit diagram showing the principles of my invention applied to the protection of an electron tube system for opening the plate circuit of the electron tube system when losses become excessive; and Fig. 7 diagrammatically shows the electrical circuit connections for the galvanometer in circuit with the thermocouples for measuring losses in an electron tube transmitter system.

It has heretofore been very difficult to measure directly the output power of any high frequency radio transmitter. This is due to the fact that it is difficult to construct a load of known resistance into which the energy of the radio transmitter may be dissipated. On the other hand it is quite simple to measure the total input to the anode circuit of the last amplifier, and if the losses in the system can be determined, the output power may be calculated. This calculation merely requires the subtraction of the losses from the total power input to give the power output. Losses in the output circuit of a high power amplifier utilizing liquid cooled tubes may be measured by the determination of the input and output temperatures of the cooling fluid. The losses in the output circuit of such an amplifier consist in the following:

(a) Tube losses due to the voltage drop of the anode circuit inside of the tube.

(b) Losses in the output coil system.

(c) Losses in the condensers and distributed capacities existing in the circuit, including losses in insulating materials which must support the physical parts of the circuit from the framework of the transmitter.

The principal loss is the loss described under (a) which is between 40% and 60% of the total power input in a transmitter having a range of 4,000 to 24,000 kilocycles. The losses under (b) range between 1½ and 6½% of the total input power. Losses under (c) range from .01% up to 7%. These losses may be grouped under the heading of "stray losses". By designing the output system to utilize a high L/C ratio the stray losses may be reduced to quite a low value. By designing the liquid cooling system so that the cooling liquid passes through the output circuit coil as well as through the water jackets which cool the anodes of the tubes, the losses generated under (a) and (b) may be determined. Should the stray losses be neglected, the possible error in the measurement of the output power would be about 3%. If, however, the L/C ratio is maintained very nearly the same over the whole frequency band, it will be possible to make a fixed correction for the stray losses so that the possible error will be reduced to a very low value.

The use of the usual mercury or alcohol type of thermometers for the measurement of the temperatures of the cooling liquid at input and output is objectionable for a number of reasons. In the first place, it is necessary to use two thermometers since the power loss is proportional to the difference in temperature of the input and output liquid. Since it is necessary to have these thermometers located near or inside of the radio transmitter, there is a possible error due to direct action of the radio frequency field upon the thermometer itself. It takes considerable time to make a measurement with such a device and it is sometimes difficult to read the thermometer to the required degree of accuracy.

The system of my invention employs a special type of thermocouple system which obviates the use of thermometers for this purpose as shown in the accompanying drawings. A group of thermocouples 1 is mounted in an insulating block 2. The wires forming the thermocouples 1 pass through the block through apertures 28, the thermocouples being disposed on both sides of the block. A rubber washer 3 with slits 11 therein to allow the thermocouple junctions to pass through, fits into a recess in each side of the block 2, thereby making a water tight connection with tube 4. Tube 4 has slots 5 in it through which thermocouples 1 pass. A block 6 holds rubber washer 3 and tube 4 in place. Tube 4 and block 6 are also made of insulating material. Thermocouples are alternately placed in the input and output liquid cooling circuits. A galvanometer G is connected to the thermocouple group. A thermo-ammeter type of instrument is used for measurement purposes. This instrument may be calibrated to read directly the power loss in the transmitter. Since the power loss in the circuit is proportional to the difference in the temperatures of the hot and cold junctions of the groups of thermocouples, it will also be proportional to the indications of the instrument since the electromotive force developed in the thermal battery is proportional to the average temperature difference of the alternate junctions of the thermocouples.

In addition to the use of this device as a loss indicating means, it may also be used to prevent damage to the tube or circuits, should the loss in the tube become excessive. This is accomplished by the connection of a relay 7 in series with the galvanometer. Relay 7 may control a relay 8 in circuit with source 9, which may be of any suitable nature such as an alternating current system, a direct current generator or battery, so as to open the anode circuit of tube 10 should the loss be excessive. Galvanometer G may be left in the circuit if desired. Relays 7 and 8 may be arranged by means of a trip mechanism to remain open when once actuated until the operator wishes to close them.

I have designated the high power electron tube generally at 12 including cathode 12a, control grid 12b and anode 12c. The cathode 12a is connected to any suitable power source such as an alternating current system, direct current generator, or battery which connects to terminals 29. The anode 12c has been represented as having means for continuously fluid cooling the anode by an arrangement of a fluid cooling jacket represented schematically at 14. The anode circuit is connected through terminals 21 with a suitable source of high potential such as a direct current generator or storage battery system. The inlet of the fluid cooling jacket 14 is represented at 15 and the outlet at 16. Insulated hose sections 17 and 18 are interposed in circuit with the inlet and outlet connections 15 and 16 and connections made with the hose sections 17 and 18 with the tubes or conduits 4 of the thermocouple system. The opposite ends of the tubes or conduits 4 are connected to insulated hose sections 19 and 20. The hose section 19 leads from the fluid supply to the inlet conduit 4. The hose connection 20 provides for the discharge of the cooling fluid from the end of the tube or conduit 4. The thermocouples 1 are electrically connected in series with the galvanometer G and the winding of relay 7 as heretofore explained. The armature 7a of relay 7 when moved by the energized winding of the relay, operates to close the circuit from source 9 through the winding of relay 8, thereby moving armature 8a to a position opening the coacting contact and accordingly opening the circuit from the source 21 to the anode 12c of the electron tube 12.

In the measurement of losses in a transmitter system, the galvanometer may be directly connected across the ends of the series connected thermocouples 1 which are disposed in the tubes or conduits 4 connected with the fluid inlet or discharge connections 19 and 20. The hose systems 17 and 18 are shown provided with cooling coils 22 and 23 connected with the concentrically disposed cylinders forming the cooling jacket 14 of the electron tube 12. In Fig. 7 I have shown the depending anode of the high power tube 12 at 12c subject to the cooling fluid which passes around the jacket 14. The reading on galvanometer G directly shows the loss in the transmitter circuit as the electromotive force developed in the thermal battery is proportional to the average temperature difference of the alternate junctions of the thermocouples.

The thermocouple apparatus is very readily inserted in the hose coil connections in the fluid cooling and discharge path of the high power system. The terminals for the apparatus have been shown at 24 and 25 electrically connected to opposite ends of the series path including the thermocouple junctures in series relation. Precaution is taken to substantially insulate the terminals from each other through the insulating block 2. The insulation block 2 coacts with the blocks 6 which are assembled on opposite sides of the conduits or tubes 4 and are secured in rigid assembly by means of screw devices 26 and 27 which are insulated one from the other through the insulating block 2. The arrangement of rubber washer or gasket 3 is such that leakage of fluid from the conduits 4 is prevented in that the gaskets are sealed wholly around the marginal edges thereof with respect to the insulating blocks 2 and 6. The coacting bars through which the securing screws and terminals pass are screw threaded and aligned with each other for facilitating the assembly of the insulation blocks with respect to the tubes or conduits 4.

It is not essential that the thermocouples be arranged in a straight path, as shown, as various shapes may be imparted to the conduit 4 and the junctions of the thermocouples actually arranged in a curved path for insuring contact between the cooling fluid and the junctions in the circulatory path of the cooling fluid.

While I have described my invention in certain of its preferred embodiments I desire that it be understood that modifications may be made and that no limitations upon my invention are intended other than are imposed by the scope of the appended claims.

The invention herein described may be manufactured and used by or for the Government of the United States of America for governmental purposes without the payment of any royalty thereon or therefor.

What I claim as new and desire to secure by Letters Patent of the United States is as follows:

1. In a measuring system for high frequency apparatus which includes a fluid cooled electron tube having fluid inlet and discharge connections, the combination of fluid inlet and discharge members forming passages for intake and discharge fluid, a multiplicity of thermocouples having their junctions disposed in said inlet and discharge members respectively, a circuit electrically connecting said junctions in series relation, and a measuring instrument connected with said circuit and operative under control of the tension developed by said thermocouples in accordance with the temperature conditions of said cooling fluid.

2. A measuring system for high frequency apparatus which includes a high power fluid cooled electron tube, the combination of fluid intake and discharge members forming passages for the flow of cooling fluid, a support of insulation material adjacent said members, a plurality of thermocouples carried by said support and having their junctions projecting into the path of cooling fluid in said conduits, a circuit electrically connecting said thermocouples in series, and a measuring instrument connected in said circuit for measuring the potential difference developed by said thermocouples.

3. A measuring system for high frequency apparatus which includes a high power fluid cooled electron tube, the combination of fluid intake and discharge members forming passages for the flow of cooling fluid, a support of insulation material adjacent said members, a plurality of thermocouples mounted in said support, said thermocouples having one row of junctions projecting into the fluid passage formed by one of said members, and another row of junctions projecting into the fluid path formed by the other of said members, a series circuit including all of said junctions in series, and a meter connected in said series circuit for measuring the difference in potential developed by the said junctions in said series circuit.

4. A measuring system for high frequency apparatus which includes a high power fluid cooled electron tube the combination of fluid intake and discharge members forming passages for the flow of cooling fluid, a support of insulation material adjacent said members, a multiplicity of thermocouples carried by said support, said thermocouples having a plurality of junctions disposed in substantially parallel rows located in the fluid passages formed by said members, a circuit electrically connecting said junctions in series, and a meter electrically connected in said series circuit and operative to measure the difference in potential developed by the two rows of thermocouple junctions.

5. A measuring system for high frequency apparatus including a high power electron tube having a fluid cooled anode, the combination of a pair of tubular members of insulation material forming passages for intake and discharge cooling fluid, a block of insulation material interconnecting said members, a multiplicity of thermocouples carried by said block having alternate junctions thereof projecting into the passages through said tubular members, a series circuit including all of said junctions and a measuring instrument connected in said series circuit.

6. In a measuring system for high frequency apparatus including an electron tube having a fluid cooled anode structure, a pair of conduits of insulation material, a fluid circulating system interconnecting said conduits with said fluid cooled anode structure, supporting means for mounting said conduits in predetermined spaced relation, a multiplicity of thermocouples carried by said supporting means with alternate junctions of said thermocouples projecting into the path of fluid flow through said conduits, a series circuit interconnecting all of said junctions, and a measuring instrument connected in said series circuit for determining the potential difference developed by the junctions in one conduit and the potential difference developed by the junctions in the other conduit.

7. In a measuring system for high frequency apparatus which includes a high power electron tube having a fluid cooled anode structure, a coupling member interconnecting a fluid supply and discharge system with the fluid supply and discharge connections to a fluid cooled anode structure, a multiplicity of thermocouples supported adjacent said coupling member, said thermocouples having a junction projecting into the fluid inlet and discharge passages of said coupling member and subject to the temperature of the intake and discharge fluid, a series circuit interconnecting said junctions, and a meter connected in said series circuit for measuring the difference in the potential developed by said junctions.

8. The method of measuring losses in a high frequency electron tube system of the class which includes a fluid cooled electron tube structure having means for supplying and discharging cooling fluid thereto, which consists in generating electrical energy proportional to the difference between the temperature of the intake and the temperature of the discharge fluid and measuring the difference of potential thus developed.

9. The method of measuring losses in a high frequency electron tube system of the class which includes a fluid cooled electron tube structure having means for supplying and discharging cooling fluid thereto, which consists in generating electrical energy proportional to the difference between the temperatures of the intake and discharge fluid, calibrating a meter to compensate for stray losses and measuring on the meter the difference between a potential which is proportional to the temperature of the intake cooling fluid and a potential proportional to the temperature of the discharge cooling fluid.

10. A measuring system for high frequency apparatus which includes a fluid cooled electron tube structure, the combination of a pair of conduits of insulation material, means for mounting said conduits in parallel spaced relation and disposed in series in the fluid inlet and discharge passages of a fluid circulatory system, the adjacent side walls of said conduits having apertures therein, a multiplicity of thermocouples carried by said mounting means, the alternate junctions of said thermocouples projecting into the fluid passages through said conduits, means for sealing said mounting means with respect to said conduits for preventing fluid leakage through said apertures, an electrical circuit interconnecting the junctions of said thermocouples in series, and a measuring instrument electrically connected in said series circuit.

LOUIS A. GEBHARD.